United States Patent [19]

Taenzer

[11] Patent Number: 4,486,076
[45] Date of Patent: Dec. 4, 1984

[54] REAL TIME STEREO IMAGING
[75] Inventor: Jon C. Taenzer, Palo Alto, Calif.
[73] Assignee: SRI International, Menlo Park, Calif.
[21] Appl. No.: 316,332
[22] Filed: Oct. 29, 1981
[51] Int. Cl.³ .............. A61B 10/00; G02B 27/22; G05D 25/00
[52] U.S. Cl. .................. 350/132; 128/660; 350/272
[58] Field of Search ............... 350/132, 432, 144, 130, 350/131, 272-274; 128/660

[56] References Cited

U.S. PATENT DOCUMENTS

| | | | |
|---|---|---|---|
| 2,244,687 | 6/1941 | Goldsmith et al. | 350/144 |
| 2,810,318 | 10/1957 | Dockhorn | 350/272 |
| 3,101,644 | 8/1963 | Lopez-Henriquez | 350/144 X |
| 3,913,061 | 10/1975 | Green | 73/633 X |
| 3,937,066 | 2/1976 | Green et al. | 73/607 |
| 3,970,361 | 7/1976 | DiMatteo et al. | 350/144 |

*Primary Examiner*—John K. Corbin
*Assistant Examiner*—Scott J. Sugarman
*Attorney, Agent, or Firm*—Urban H. Faubion

[57] ABSTRACT

A pair of image fields which are views of an object from two slightly different angles at near enough the same time to constitute a stereo image field pair is produced by providing a pair of similar coaxial counterrotating refracting prisms between the object viewed and the image field and alternately transmitting an image field through the prisms on opposite sides of the plane through or parallel to the central axis of the two prisms.

6 Claims, 7 Drawing Figures

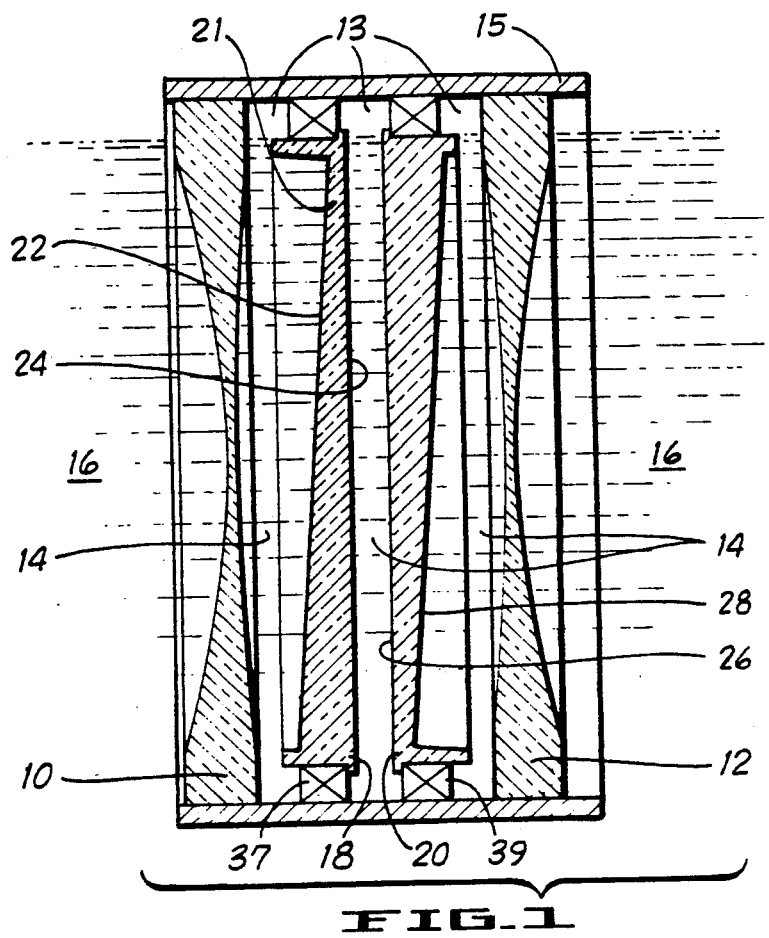
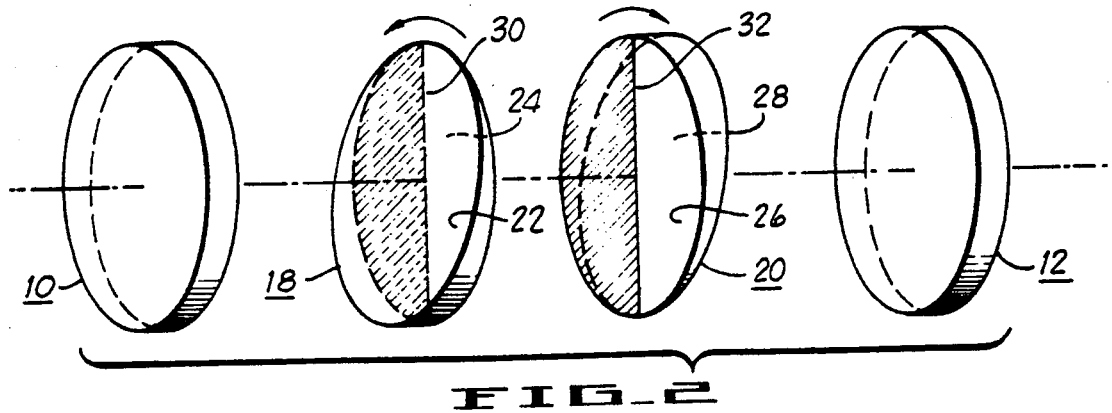

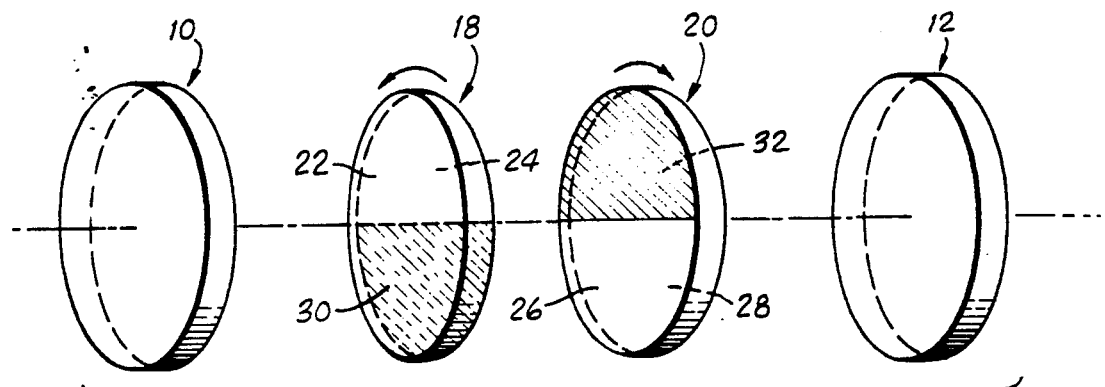
FIG_3
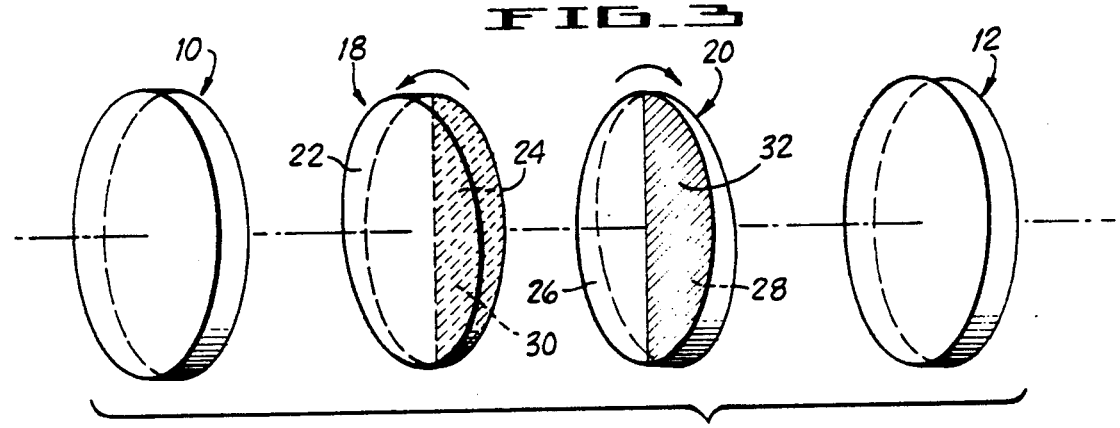
FIG_4
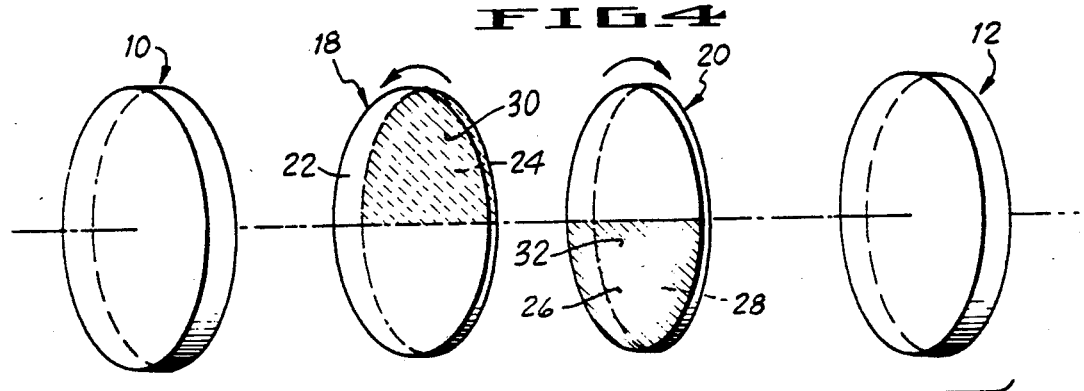
FIG_5
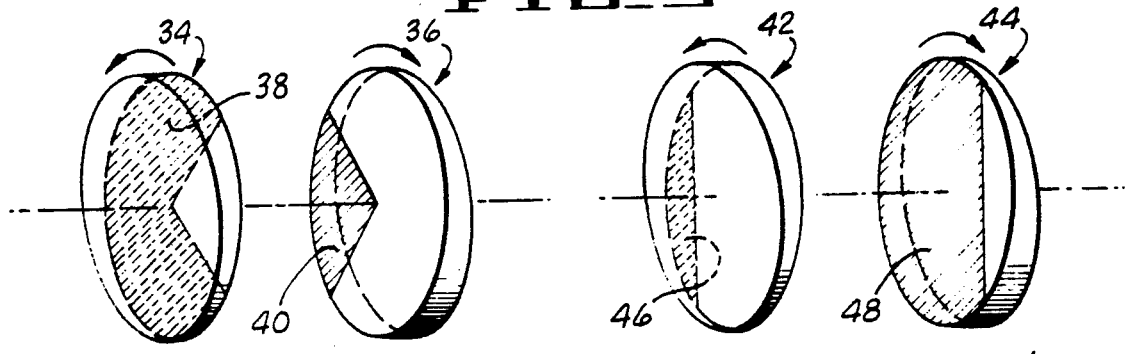
FIG_6
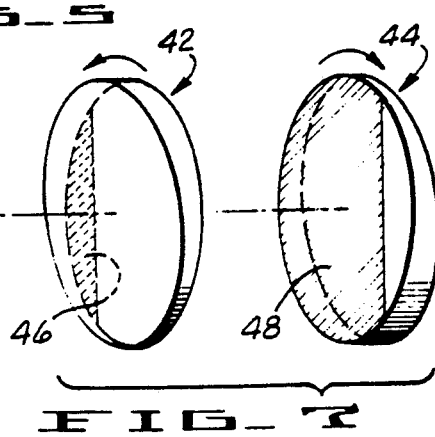
FIG_7

REAL TIME STEREO IMAGING

ORIGIN OF THE INVENTION

The invention described herein was made in the course of work under a grant or award from the Department of Health and Human Services.

BACKGROUND OF THE INVENTION

"Real time" ultrasonic imaging of organs in a living organism, e.g., a heart in a living human body, has become a well accepted diagnostic tool which for many particular conditions either supplements or replaces instruments that rely on invasive techniques, such as catheterization, or more harmful media, such as x-rays. Real time transcutaneous images of in vivo human anatomy using the relatively harmless ultrasound medium, which makes clear the spatial aspects, i.e., the stereo or perspective aspects, of the image generated reveals information which is even more useful for the assessment of medically significant information. In other words, the addition of a third dimension to the already highly useful "monaural" ultrasonic images introduces another valuable diagnostic aspect.

The ultrasonic stereo imaging system described and illustrated here is specifically designed for medical diagnostics, and therefore, the description is made in connection with this most demanding application. It will be particularly understood, however, that the structures and principles are applicable in many other uses of acoustic imaging as well as to the generation of real time stereo images in any energy modality used for imaging purposes, i.e., optical, infrared, ultrasonic, etc.

A first use of the system is in place of a monaural focusing and deflecting system such as that shown, described and claimed in U.S. Pat. No. 3,913,061, issued Oct. 14, 1975 to Philip S. Green and assigned to the assignee of the present invention. Consequently, the stereo imaging system is shown and described in that setting. Since that patent and the patents referred to therein discuss the problems which are addressed and solved by the monaural system, the information is not repeated here. The subject matter of those patents, however, is specifically incorporated herein by reference. For example, mode conversion problems at liquid/solid interfaces are discussed in U.S. Pat. No. 3,913,061 and U.S. Pat. No. 3,982,223, issued Sept. 21, 1976 to Philip S. Green and assigned to the assignee of the present invention. Therefore, the mode conversion problems are not discussed again in this specification, even though the same acoustic lens arrangement found in U.S. Pat. No. 3,982,223 is applicable in the present imaging system. Similarly, a converter array used to convert the stereo image field pair generated by the system disclosed here is shown, described and claimed in U.S. Pat. No. 3,971,962, issued July 27, 1976 to Philip S. Green and assigned to the assignee of the present invention (also cited in U.S. Pat. No. 3,913,061). The present focusing and deflecting system is designed specifically to be used with such an array; it should be apparent, however, that its usage is broader. Further problems in the conversion of the image fields to viewable condition are addressed in U.S. Pat. No. 4,061,415, issued Dec. 6, 1977 to Jon C. Taenzer and assigned to the assignee of the present invention, and the subject matter of this patent is also incorporated herein by reference.

Like the monaural system of U.S. Pat. No. 3,913,061, the present stereo system provides an ultrasonic image focusing and deflection system for focusing an ultrasonic compressional image on a surface, e.g., a plane or the surface of the segment of a sphere, and for cyclically displacing all points on the compressional image field surface so that they all pass a line whereby the entire image field may be converted by a single line array of transducer elements to a signal capable of use in presenting a visual image. Further like the monaural system, the embodiment of the image deflection system illustrated is intended for use in liquid media and is provided with two or more solid lens elements and a pair of image deflection elements which include therebetween a liquid filler medium. The image deflection elements constitute a pair of coaxially positioned prisms or wedges which are simultaneously rotated in opposite directions so that the transmitted image field is moved past a given line (stationary array of transducers) twice for each full rotation of the prisms.

SUMMARY AND OBJECT OF THE INVENTION

In the present invention a pair of image fields, which are views of an object from two different angles at near enough the same time to constitute a stereo image field pair, is produced by placing a pair of counterrotating refracting prisms between the object viewed and the image field and simultaneously blocking energy transmission on one side of a plane through a central axis and transmitting energy through the prisms on the opposite side of the central axis, and subsequently simultaneously blocking energy from transmission on the said opposite side of the central axis and transmitting energy through the prisms on the said one side of the central axis in alternating fashion as counterrotation of the prisms proceeds. In this manner transmission from the object to the viewing field from two different angles (opposite sides of the prisms) at nearly the same time is effected. In a preferred embodiment each one of the pair of prisms is partially coated with a material which blocks energy transmission from the object to the viewing field so that energy is blocked where the coated portions of the prisms are located and transmitted where there is no coating on either of the prisms between the object viewed and the image field.

The novel features which are believed to be characteristic of the invention are set forth with particularity in the appended claims. The invention itself, however, both as to its organization and method of operation, together with further objects and advantages thereof may best be understood by reference to the following description taken in connection with the accompanying drawings.

BRIEF DESCRIPTION OF THE DRAWINGS

FIG. 1 is a partially diagrammatic central, vertical, longitudinal section through an image deflection and focusing assembly which illustrates the concept of the invention;

FIGS. 2 through 5 inclusive are exploded schematic views in perspective of the elements of the image deflection and focusing assembly showing the deflecting prisms of FIG. 1 in various states of rotation to illustrate how the stereo image pairs are developed; and FIGS. 6 and 7 are also exploded views in perspective of image deflection and focusing assemblies showing two additional embodiments of the invention.

DESCRIPTION OF PREFERRED EMBODIMENTS

A preferred embodiment of a composite acoustic imaging and image deflection system which is used to generate the stereo image pairs is illustrated in FIGS. 1 through 5 inclusive. The combination of focusing and deflecting elements of the system (in the illustrated embodiment) and their cooperation are shown, described and claimed in U.S. Pat. No. 3,913,061, entitled "Focusing and Deflecting System for Acoustic Imaging", supra. Further, the focusing elements themselves may be the same as those described and claimed in the previously referred to U.S. Pat. No. 3,982,223, entitled "Composite Acoustic Lens," supra. However, for the sake of a complete description and because of the unique cooperation between imaging and deflecting parts of the system, the focusing and deflection elements and their action are again described here.

Focusing action (imaging) of an incident compressional image field is provided by two solid lens elements 10 and 12 which are both generally biconcave in shape, axially aligned and spaced apart so that a cavity 13 is formed therebetween. Wedge elements (prisms) 18 and 20, which are interposed between the lens elements 10 and 12 (in the cavity 13), are provided for the purpose of causing the incident compressional image field to be moved in such a manner that a substantially linear array of discrete transducer elements can transform the full image field to electrical signals from which a visual characterization of the image field can be made, e.g., as on the face of an oscilloscope. The composite acoustic lens and image field deflection assembly is intended to be used in a liquid medium; it is therefore illustrated as being housed in a generally cylindrical container 15 and immersed in a liquid medium 16 (called the surrounding liquid medium). The cavity 13 between the lenses 10 and 12 is also filled with a liquid 14. It is most convenient to construct both the lenses 10 and 12 and the acoustic wedges 18 and 20 with a circular outer periphery.

Consider first the acoustic wedges 18 and 20 in the stationary position illustrated in FIG. 1, in which the image is transmitted essentially unchanged in character and aspect. Next consider the image deflection provided by the counterrotation of the wedges, and later the method of developing the images from different viewing angles that constitute the stereo image pairs.

Since the generation of the stereo image pairs constitutes the main thrust of the present invention and since the preferred apparatus for compressional wave image formation and deflection as well as the linear array of transducers used to transform the total compressional image field into electrical signals which are subsequently converted into a visual representation are described in detail in issued patents (viz. U.S. Pat. Nos. 3,913,061 and 3,971,962), the associated apparatus which rotates the wedges 18 and 20 in opposite rotational senses to provide the proper deflection, details of liquid seals for the lenses 10 and 12 and wedges 18 and 20, and materials used are not illustrated and described here. Action of the counterrotating wedges 18 and 20, however, is sufficiently important to an understanding of the stereo image pair formation to warrant dilation.

In this connection note that the wedges, 18 and 20, as illustrated, are made of a material with an accoustic velocity substantially different from that of the liquid 14 as are the lenses 10 and 12 and are mounted in an axially aligned relationship along the path of incidence of a compressional image field which is being focused by the lens elements 10 and 12. The wedges 18 and 20 are held in axially aligned relationship with lens elements 10 and 12 by mounting them rotatably inside the cylindrical container 15 in annular bearing races 37 and 39.

The wedge 18 (on the left in the illustration) is oriented with its thickest dimension at the bottom and its thinnest dimension at the top. It has a pair of planar surfaces 22 and 24. The inner planar surface 24 is shown normal to the longitudinal axis of assembly housing 15 and the outer planar face 22 slopes relative thereto. With the acoustic wedge 18 stationary, the propagation direction of an acoustic wavefield incident upon the sloping surface 24 is shifted upward by an angular amount determined by the slope of the surfaces 22 and 24 and the relative acoustic velocities of the wedge material and fluid 14 according to standard refraction theory. In the device illustrated the wedge 18, like the lenses 10 and 12, has a circular periphery.

The acoustic wedge 20 (to the right in the illustration) is identical in every respect to the acoustic wedge 18 except that it is rotated 180° about its longitudinal axis relative to acoustic wedge 18. That is, acoustic wedge 20 is of the same material and has a pair of planar surfaces 26 and 28. The planar surface 26 of the wedge 20, which is directly adjacent the vertical planar surface 24 of the acoustic wedge 18, is also normal to the axis of the assembly housing 15. Note that the first surface (22) of acoustic wedge 18 encountered by an acoustic wavefield traveling from left to right (in the figure) is precisely parallel to the exit surface 28 of acoustic wedge 10, and the (vertical) exit planar surface 24 of acoustic wedge 18 is parallel to the entry acoustic surface 26 of acoustic wedge 20 for the position shown.

Thus, for the position shown, acoustic wedge 20 shifts the propagation direction of an incident wavefield downward by precisely the same angular amount that wedge 18 shifts it upward. Consequently, an acoustic wavefield traveling from left to right in the assembly is focused to provide an acoustic image as previously described by the lens elements 10 and 12 and its general position in the image plane (aspect) is unaltered by the acoustic wedges 18 and 20.

It follows that if acoustic wedges 18 and 20 are rotated in opposite rotational senses, one relative to the other, by 180°, the sloping surfaces 22 and 28 of the two wedges which are parallel to one another, as illustrated in FIG. 1, are again parallel to each other but slope in the opposite sense. With such a rotation, the thick portion of acoustic wedge 18 is positioned at the top of the assembly housing 5 and the thinnest portion of acoustic wedge 20 will also be at the top. Thus, a compressional image field incident on the outer planar surface 22 of wedge 18 is shifted down (instead of up, as with the previous case) and is shifted up precisely the same amount by acoustic wedge 20. Again for this position, then, the incident acoustic image is not shifted upon exit from the focusing and deflection assembly. As will be explained in more detail subsequently, for the intermediate positions (intermediate of the two positions of no image deflection, just described) of the wedges 18 and 20, the incident compressional image field is shifted first to one side and then the other.

With the design principles already described, one skilled in the art can design a lens and image deflection system in accordance with the teaching of the invention.

While other modes of operation are feasible, it is most practical to design the system so that no spherical aberration is produced by the wedge elements 18 and 20, that is, to design the system in such a way that all waves passing through the wedges are planar. This is accomplished by designing the system so that the object plane to be imaged is a focal length from the lens element on which the image plane is incident.

Since the ultimate object of the imaging and deflecting system as illustrated here is to transform a total incident compressional image field into electrical signals which can subsequently be converted into a visual representation and since the particular means for performing the conversion is comprised of a linear array of transducers (not shown or described here but fully illustrated and described in U.S. Pat. No. 3,971,962, supra), the object is to sweep the full image field back and forth across the line of the linear transducer array with no rotary motion of the image. That is, the linear array (not shown) is positioned downstream of the focusing and deflecting assembly in a plane that is vertical and passes through the central axis of the tubular lens and deflection assembly housing 15 (also defined as a line perpendicular to the axis of alignment and lying in a plane containing the axis of alignment). Thus, the object of the deflecting system is to sweep the image orthogonally past that line without rotational or lateral displacement with respect to the linear transducer array (since the line defined by the transducer array is, in this case, described as being vertical and we use "lateral" here to means along the length of the line, the lateral displacement to be avoided is in fact vertical).

As the acoustic wedges 18 and 20 are rotated in opposite senses but at the same speed (the same number of angular degrees per second), the angle between the initially parallel outer faces 22 and 28 progressively changes from zero at the position illustrated in FIGS. 1 and 2 to a maximum when the wedges have each been rotated 90° (position of FIG. 3). As the wedges are further rotated, the angle between the initially sloping but parallel faces 22 and 28 again becomes a zero (for 180° rotation, FIG. 4), and a maximum in the opposite direction (for 270° rotation, FIG. 5). The angle again is reduced to zero at the starting position (360° rotation, FIG. 1). The combination of the two wedges rotating in opposite senses at the same rotational speed effectively presents a variable angle wedge. Thus, the incident compressional acoustic image field is effectively swept back and forth past a line perpendicular to the axis of alignment of the elements and lying in a plane containing the axis of alignment. The sweeping action takes place once in each direction for each full rotation of the two acoustic wedges and without rotary or lateral displacement along the length of the line (again, "lateral displacement" meaning displacement along the length of the line of transducers).

Having considered the way the counterrotating prisms 18 and 20 operate on an incident compressional image field that is focused by the lens elements 10 and 12 to deflect the image back and forth past a line perpendicular to the axis of alignment once in each direction for each full rotation of the two acoustic wedges 18 and 20 and without rotary or lateral displacement, i.e., without displacement along the axis of alignment of the trasducers, next consider the method of producing the images from different viewing angles that constitute the stereo image pairs. Recall that to produce real time stereo images, an object must be viewed from two different angles at the same (or nearly the same) time.

Simply stated, a method which allows stereo image pairs to be produced with the illustrated ultrasonic camera in real time, with only slight modifications to the system (the "monaural" system), involves "viewing" the object (subject) through a different portion of the image focusing and deflection assembly on opposite sides of a plane through the central longitudinal axis each full sweep of the image, i.e. each time the image is swept past the image translating line (linear array of transducers for this embodiment). This is accomplished by blocking first one side of the transmitted image and then the other, while allowing transmission on the opposite side.

The preferred embodiment is illustrated in FIGS. 2 through 5 inclusive. The elements in these views are the same as those in FIG. 1, and corresponding elements are given the same reference numerals. In this embodiment, blocking is accomplished by coating a portion (a half circle segment) of each of the counterrotating wedges 18 and 20 with an ultrasonically opaque material, e.g., plastic foam or ultrasonically absorbent rubber, oriented so that the compressional image field transmitted and translated by the wedges during at least part of 180° of rotation is transmitted through one side of the lens system while the other side is effectively blocked, and the compressional image field transmitted and translated during a least a part of the next 180° of rotation constitutes energy from the opposite side of the lens system while the first side is effectively blocked.

A clear understanding of this action may be had by considering progressively FIGS. 2 through 5, inclusive, which show successive 90° rotational stages from a starting position in FIG. 2. As previously explained, an image field transmitted through the lens and wedge system is not deflected for two positions of the wedges 18 and 20, where the thickness of the combination is uniform over the full wedge area, viz., at 0° rotation of the wedges, as illustrated in FIG. 2, and 180° rotation, as illustrated in FIG. 4. That is, in these two positions the thickest part of one wedge and the thinnest part of the other are in direct line. In order to block one side of an incident image containing compressional ultrasonic field while allowing transmission of the other side, a corresponding one half of each wedge (18 and 20) is coated with ultrasonically opaque material (respectively labeled 30 and 32) in such a manner that the left side at 0°, FIG. 2 is blocked while the ultrasonic field on the right side is transmitted. At the opposite rotation, i.e., 180° (FIG. 4), and again for no deflection of the image, the right side is blocked while the ultrasonic field on the left side is transmitted, because the halves of the wedges 18 and 20, which are coated (30 and 32), correspond at the right side (as illustrated). Thus, in this position, the left side of the wedges 18 and 20 is clear and passes the incident ultrasonic field. Just considering these two extremes, it is seen that the energy blocking and transmission are such that energy is transmitted through only one side at a time and that the transmission occurs first on one side of a vertical plane through the central axis of the system and then on the other. Since the two sides of the lens and deflection system (on opposite sides of a central vertical plane, as illustrated) are physically separated, the transmitted images on the opposite sides are produced from two different angles of view. Thus, every other scanned image is one image of a stereo pair while the opposite scanned image comprises the other image of a stereo pair. Note here that the best operation is obtained when the energy absorbent coatings are applied to the inner planar wedge surfaces 24 and 26 which face each other.

Having considered the extreme positions of the wedges 18 and 20, i.e., at 0° and 180° rotation (FIGS. 2 and 4), now consider intermediate positions. Starting with the position of the wedges with the right side of the system fully transmitting (FIG. 2, 0°) as the wedges rotate in opposite directions (as illustrated, the first wedge 18 is rotated counterclockwise and the second wedge 20 is rotated clockwise), the coatings 30 and 32 close off the transmitting area in a scissoring action so that a smaller and smaller segment of the lens system remains transparent as the image is deflected more and more, but the transmission remains on the same side of a vertical plane down the center of the system (right side in the figure) until the wedges have rotated to the first fully deflecting position (90° rotation, illustrated in FIG. 3). When the wedges have rotated to the first fully deflecting position, the compressional image field is fully blocked, since the coating 30 on the first wedge 18 blocks the entire top half of the field and the coating 32 on the other wedge blocks the entire lower half of the field. As the wedges 18 and 20 continue to rotate beyond 90°, the blocking areas (coatings 30 and 32) start to part on the opposite (left) side of the central plane, providing a "view" from the left side of the system. This action also starts the image translation in the opposite direction as taught in U.S. Pat. No. 3,913,061, supra., and as previously discussed.

The transmitting area continues to increase until the wedges 18 and 20 reach the second nondeflecting position (180°, FIG. 4), whereupon the transmitting area starts to decrease. The transmitting area continues to decrease on the same (left) viewing side until the wedges "scissor" closed at the next fully deflecting position (270°, FIG. 5). For this position no energy passes. That is, at 270° the blocking material 30 on the counterclockwise rotating wedge 18 blocks the entire upper half of the field and the blocking material 32 on the clockwise rotating wedge 20 blocks the entire lower half of the field. The transmitting area then starts to open on the opposite (right) side of the system again as the image translation returns to the first direction. Thus, it is seen that transmission of an incident compressional image wave alternates from one side to the other as the wedges rotate, and that one side transmission corresponds to one image translation direction while the other side transmission corresponds to the other image translation direction.

In the embodiment illustrated, the prisms 18 and 20 rotate at a rate of 7½ revolutions per second and produce two pictures per revolution (360° rotation), or 15 pictures per second. Since alternate pictures are opposite ones of a stereo pair, this arrangement gives 7½ stereo pairs per second, which has proven adequate. If picture flicker is a problem, however, the speed of rotation can be increased or scan conversion used. Also, it is noted that the prisms 18 and 20 each are exactly half covered. There are both advantages and disadvantages to such an arrangement. An advantage of the embodiment is that it gives reasonable viewing angle with essentially total isolation for the individual "views" of the stereo pair. A disadvantage is the fact that the intensity, or "brightness," of the transmitted image field is not uniform from edge to edge as it is translated back and forth, but is less intense (dimmer) at the regions where greatest deflection occurs than at the center. In fact, since the transmitted energy is totally blocked twice during each 360° of wedge rotation, only the central portion of the scan produces an image. For most applications this does not create a problem. The fact that the movement of the image back and forth is a sinusoidal motion, so that the translation moves relatively slower near (both just before and just after) the point of reversal of image direction, gives more time for the transducers to generate electrical signals at the area of reduced intensity. It is also in this area where the half coated blocking material closes rapidly. Thus, the image is nearly uniformly bright over a large central portion of the total image area.

Almost an infinite variety of configurations of energy blocking materials is useful, but for practical reasons only a few preferred embodiments are illustrated. Design considerations, however, are discussed so that a practitioner can optimize the design for a particular application.

Consider, for example, the wedges 34 and 36 of FIG. 6 which are designed to give good isolation between the two stereoscopic images in conjunction with good uniformity of transmitted energy over the full field. The two wedges 34 and 36 are in a nondeflecting position, like the wedges 18 and 20 of FIGS. 1 and 2, and intended to be used in the same setting. The first of the two wedges (on the left in the Figure) rotates in the counterclockwise direction (the same convention used throughout this specification), has a 270° sector of its vertical planar inner surface coated with sound absorbing material 38, and the 90° clear portion (sector) is centered on a horizontal plane at the near side of the figure. That is, the clear sector is centered at 0°, looking straight in from the left side of the figure, so that the only transmitted energy is on the right side. In order to produce the "right side" stereo image the second wedge 36 of the set has a corresponding clear area in the same position for this wedge orientation. In fact, for this embodiment the clear area of the second wedge is a sector matching both in shape and size (270°) the coated area of the first wedge 34, and only a 90° sector of its vertical planar inner face is coated with sound blocking material 40. The 90° sound blocking segment 40 of the second wedge 36 is also centered about a horizontal plane through the central axis of the wedges but disposed on the far side of the face. Thus, the clear 90° sector on the first wedge and the blocking 90° sector 40 of the second wedge 36 are opposite each other and symmetrically disposed on opposite sides of a central vertical plane. A rotation of each of the wedges, 34 and 36, in opposite directions by 180° then gives the full left side stereo image.

Although other views of this embodiment are not shown, it will be seen that as the two wedges 34 and 36, rotate in opposite senses from the illustrated position, the leading edge of the clear sector on the first wedge 34 and the leading edge of the coated sector 40 on the second wedge 36 arrive at the 90°, or top quadrant (central vertical plane) position at the same time, and the transmission of the incident energy continues to be closed off on the right side until both the transmitting sector (quadrant) of the first wedge 34 and the blocking sector 40 (quadrant) of the second wedge are in register after 90° of rotation and full blocking of energy occurs. Left side transmission starts to occur with further rotation until full registration of nonblocking material, when the leading edge of the nonblocking sector of the first wedge 34 passes the trailing edge of the sector of blocking material 40 on the second wedge 36 and transmission of energy starts to take place on the left side to form the "left side" image of a stereo pair. In this manner energy transmission occurs, first on one side of the system while it is blocked on the other, and then the arrangement is reversed so that the opposite one of a stereo image pair is produced. Thus, in alternating fashion a "left" and a "right" stereo image is produced for each full rotation of the prisms 34 and 36. For the arrangement just described, an image of moderately good uniformity and also moderately good stereo angle and isolation is produced.

If a small absorbing or blocking segment is properly placed on each wedge, image (energy transmission) uniformity is reduced only slightly, but mixing of "left side" and "right side" images occurs, and thus, while the stereo effect can be observed, it is not the best. An example of this can be visualized (example not illustrated) by considering two wedges each having a single quadrant coated with absorbing material like the second wedge 36 in FIG. 6. Contemplate the nondeflecting wedge orientation of FIG. 6 with a sector of both wedges coated in the same quadrant so that one side is clear for transmission. For example, the absorbing sector of both wedges is located on the far side (relative to a central vertical plane) of the wedges and oriented so that a horizontal plane through the central axis bisects and angle of the sound absorbing sectors, just like the sector on the second wedge illustrated in FIG. 6.

The converse of this arrangement (also not illustrated) eliminates the mixing of "left side" and "right side" stereo images and provides an excellent stereo effect, but uniformity of the transmitted and translated image is not as good. That is, both of the wedges have blocking material covering a 270° sector and only a 90° sector is free for transmission. Again for a nondeflecting orientation of the wedges as illustrated in FIG. 6, the transmitting areas are on the near side and are bisected by a horizontal plane through the central axis, just like the transmitting sector of the first wedge in the illustration. For this arrangement, transmission occurs twice each 360° of revolution of the counterrotating wedges, but only for a narrow angle of rotation.

The stereo viewing angle (view angle separation) is increased by moving the transmitting area outwardly away from the central axis of the wedges. Such is the case for the system illustrated in perspective in FIG. 7. Two wedges, 42 and 44, are in axial alignment and oriented in a nonimage deflecting position, like those in FIGS. 1, 2 and 6, and like the wedges of FIGS. 2 and 6, the transmitting area gives a "right side" view in this position. The coated, or blocking, portions 46 and 48, respectively of both wedges 42 and 44 in this embodiment are segments of the circles defined by the vertical planar faces rather than sectors, as are those of FIG. 6. Further, the segments covered with energy blocking material 48 on the second wedge (reading from left to right again) of the system constitutes about two thirds of the wedge face, leaving only the outer third (displaced from the center) clear for transmission of energy. In order to provide energy blocking between the right and left stereo image transmission positions, the segment of energy absorbing material 46 on the first (left) wedge 42 substantially matches the segment of clear area on the second wedge. Thus, at the nondeflecting position of the wedges illustrated in FIG. 7, the "right side" stereo view, which is spaced from the center of the system, is transmitted and the clear areas coincide again for 180° rotation to provide a "left side" stereo image, spaced the same distance as the other view from the center of the system. For both 90° of rotation and 270° of rotation the energy absorbing areas of the two wedges match to prevent energy transmission.

Thus it is seen that the objects of the invention have been carried out by providing a system for producing real time stereo images which is practical for many different energy modalities and imaging purposes. Further, the principles have been explained so that many design modifications may be made. It will therefore be understood that the invention is not limited to the particular embodiments shown. It is contemplated that any such modifications as fall within the true spirit and scope of the invention will be covered by the appended claims.

What is claimed is:

1. In a system for producing stereo image pairs in real time, said system including an image deflecting means for repeatedly sweeping an image field orthogonally past a given line so that every portion of that image field moves past that line, and blocking means for preventing opposite sides of the said image from reaching said line on alternate sweeps of said image field past the said line, thereby to present a different image view on alternate sweeps and thus present a different one of a stereo image pair at the said line on alternate sweeps.

2. In a system for producing stereo image pairs in real time as defined in claim 1, wherein the said image deflecting means constitutes at least a pair of prisms rotatably mounted in axially aligned relationship along the path of incidence of the image, each of said prisms having at least one planar surface forming an angle with the axis of said path of incidence and substantially parallel to the corresponding surface on the other for a given rotational position, and means to rotate said prisms in opposite rotational senses at equal angular displacements while maintaining the said axial alignment, whereby the said planar surfaces are substantially parallel for two positions during rotation.

3. In a system for producing stereo image pairs in real time as defined in claim 2, wherein the said blocking means constitutes a coating of material opaque to the said image field covering a portion of each of said prisms.

4. In a system for producing stereo image pairs in real time as defined in claim 3, wherein each of the said prisms has a generally circular outer peripheral configuration and wherein the said coating material covers a segment on at least one surface of each of said wedges which segments substantially block the full image field for two positions in each full rotation.

5. In a system for producing stereo image pairs in real time as defined in claim 4 wherein the said segments covered by said coating material on each prism comprises a sector or substantially one half of the said coated surface of each prism.

6. In a system for producing stereo image pairs in real time as defined in claim 5 wherein the said sector covered by said coating material on one of said pair of prisms comprises substantially three quarters of the said surface and the coated sector on the other of said pair of prisms comprises substantially one quarter of the said coated surface.

* * * * *